United States Patent
Muramoto

(10) Patent No.: US 10,038,823 B2
(45) Date of Patent: Jul. 31, 2018

(54) IMAGE FORMING APPARATUS

(71) Applicant: KYOCERA Document Solutions Inc., Osaka (JP)

(72) Inventor: Hideya Muramoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/443,440

(22) Filed: Feb. 27, 2017

(65) Prior Publication Data

US 2017/0257528 A1 Sep. 7, 2017

(30) Foreign Application Priority Data

Mar. 3, 2016 (JP) ................................. 2016-041113

(51) Int. Cl.
 *H04N 1/409* (2006.01)
 *H04N 1/58* (2006.01)
(52) U.S. Cl.
 CPC ............. *H04N 1/58* (2013.01); *H04N 1/4092* (2013.01)

(58) Field of Classification Search
 CPC ......... H04N 1/58; H04N 1/409; H04N 1/4092
 See application file for complete search history.

(56) References Cited

U.S. PATENT DOCUMENTS

2004/0150857 A1 8/2004 Sawada

FOREIGN PATENT DOCUMENTS

JP 2000-261671 9/2000

*Primary Examiner* — Christopher D Wait

(57) ABSTRACT

An image forming apparatus includes an image area determining unit and an image processing unit. The image area determining unit is configured to determine a character edge area and a character inside area in an input image. The image processing unit is configured to be capable of performing (a) an inward expansion process for a pixel belonging to the image inside area, the character expansion process performed inwardly from the character edge area and (b) an outward expansion process for a pixel belonging to the character edge area, the outward expansion process performed outwardly from the character inside area. Further, the image processing unit selects the inward expansion process and/or the outward expansion process in accordance with an average brightness value of pixels belonging to the character inside area, and performs the selected the inward expansion process and/or the outward expansion process.

5 Claims, 7 Drawing Sheets

BLACK CHARACTER

IMAGE FORMING APPARATUS

CROSS-REFERENCE TO RELATED APPLICATIONS

This application relates to and claims priority rights from Japanese Patent Application No. 2016-041113, filed on Mar. 3, 2016, the entire disclosures of which are hereby incorporated by reference herein.

BACKGROUND

1. Field of the Present Disclosure

The present disclosure relates to an image forming apparatus.

2. Description of the Related Art

In a copy process in a color image forming apparatus, an outline part of a black thick character in an input image is determined as a character edge area, and an inside part of the black thick character is determined as an image area. Consequently, in color printing, if a color registration error occurs in an inside part of a black thick character, then a blank gap (a white gap) may occur between an outline part of the black thick character and the inside part.

Therefore, an image forming apparatus expands the character edge area inward of the character, and thereby restrains the blank gap.

However, expanding the character edge area inward of the character as mentioned causes a width of the character edge part to be larger, and therefore the character is unintentionally bordered. Thus, the blank gap is restrained but the unintentional bordering occurs, and consequently such character does not appear at high image quality.

SUMMARY

An image forming apparatus according to an aspect of the present disclosure includes an image area determining unit and an image processing unit. The image area determining unit is configured to determine a character edge area and a character inside area in an input image. The image processing unit is configured to be capable of performing (a) an inward expansion process for a pixel belonging to the character inside area, the inward expansion process performed inwardly from the character edge area and (b) an outward expansion process for a pixel belonging to the character edge area, the outward expansion process performed outwardly from the character inside area. Further, the image processing unit selects the inward expansion process and/or the outward expansion process in accordance with an average brightness value of pixels belonging to the character inside area, and performs the selected the inward expansion process and/or the outward expansion process.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
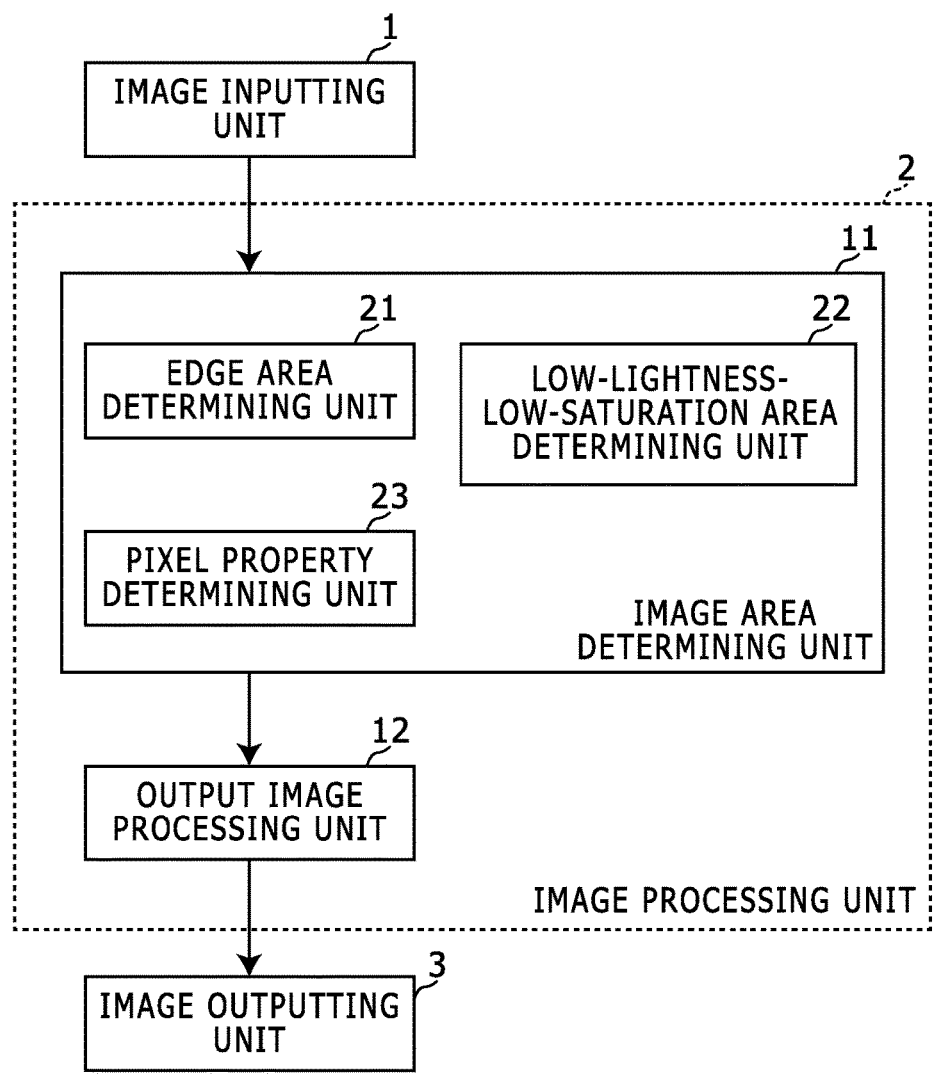
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is, for example, a copier, a multi function peripheral, or the like.

The image forming apparatus shown in FIG. 1 includes an image inputting unit 1, an image processing apparatus 2, and an image outputting unit 3. The image inputting unit 1 includes for example a scanner, and optically scans a document image page by page and generates image data of the document image and outputs the image data to the image processing unit 2. The image processing unit 2 performs sorts of image processing for the image data inputted from the image inputting unit 1, and outputs to the image outputting unit 3 the image data for which the image processing has been performed. The image output unit 3 includes for example an electrophotographic color print engine, and prints on a printing paper sheet an image based on the image data provided from the image processing unit 2.

The image processing unit 2 includes an image area determining unit 11 and an output image processing unit 12.

The image area determining unit 11 determines a character edge area and a character inside area in an input image based on the inputted image data. Specifically, the image area determining unit 11 determines an area property of each pixel in the input image data as a character edge area, a character inside area or a blank (background) area.

The image area determining unit 11 includes an edge area determining unit 21, a low-lightness-low-saturation area determining unit 22, and a pixel property determining unit 23.

The edge area determining unit 21 extracts an edge in an input image based on the input image data, for example, using a Laplacian filter or the like, and determines a range on a high density side at the edge, and the range is determined on the basis of a density difference between the high density side and a low density side at the edge. Therefore, in a character with a higher density, a larger character edge area is determined. Usually, the width of the character edge area is about two or three pixels.

The low-lightness-low-saturation area determining unit 22 determines as a low-lightness-low-saturation area an area of a pixel of which a lightness is lower than a predetermined threshold lightness value and a saturation is lower than a predetermined threshold saturation value in the input image based on the input image data.

The pixel property determining unit 23 determines a property of each pixel as a character edge area, a character inside area or a blank (background) area in the input image based on the input image data.

Figure 2:
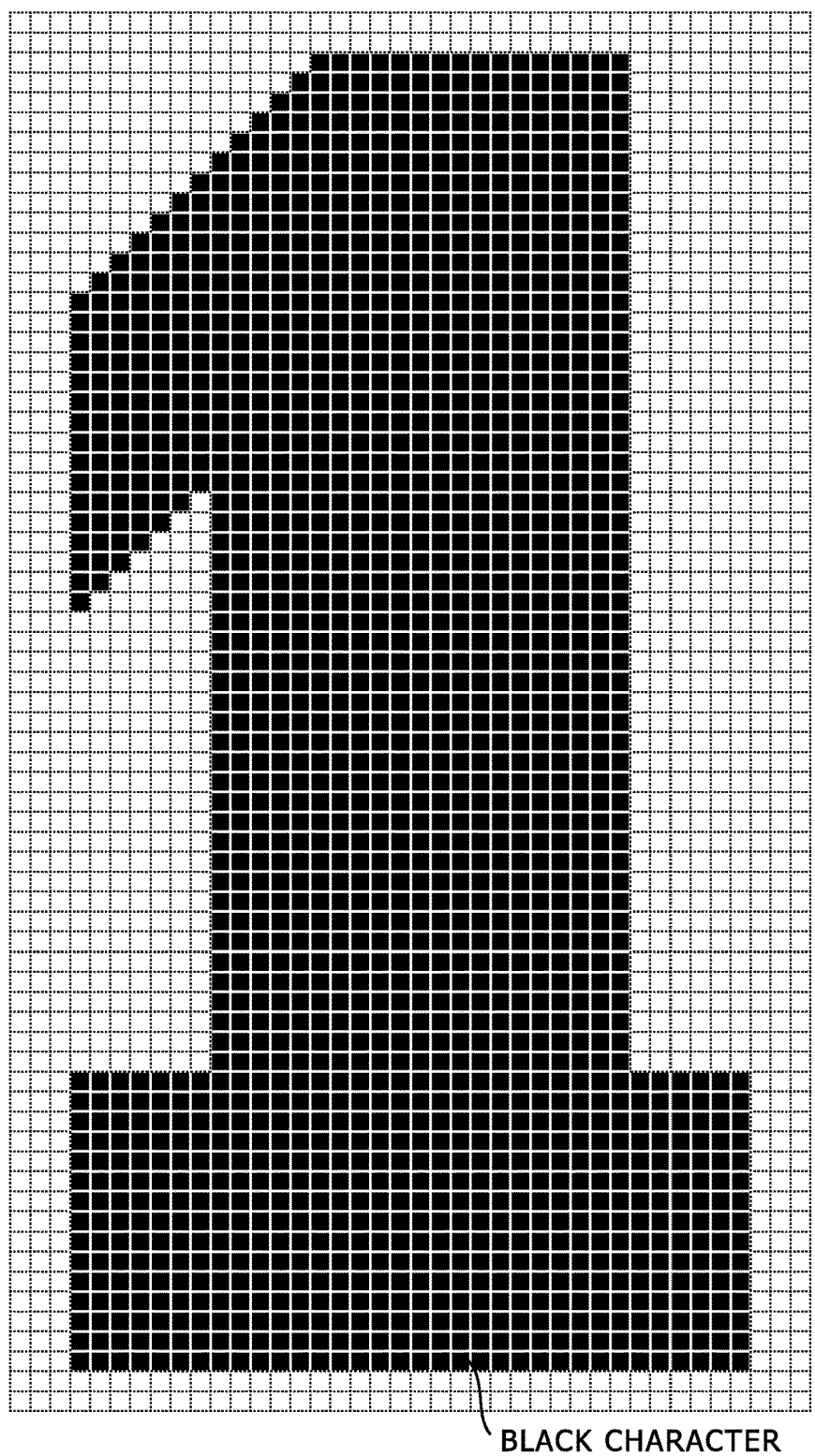
FIG. 2 shows a diagram that indicates an example of a character in an input image.
Figure 3:
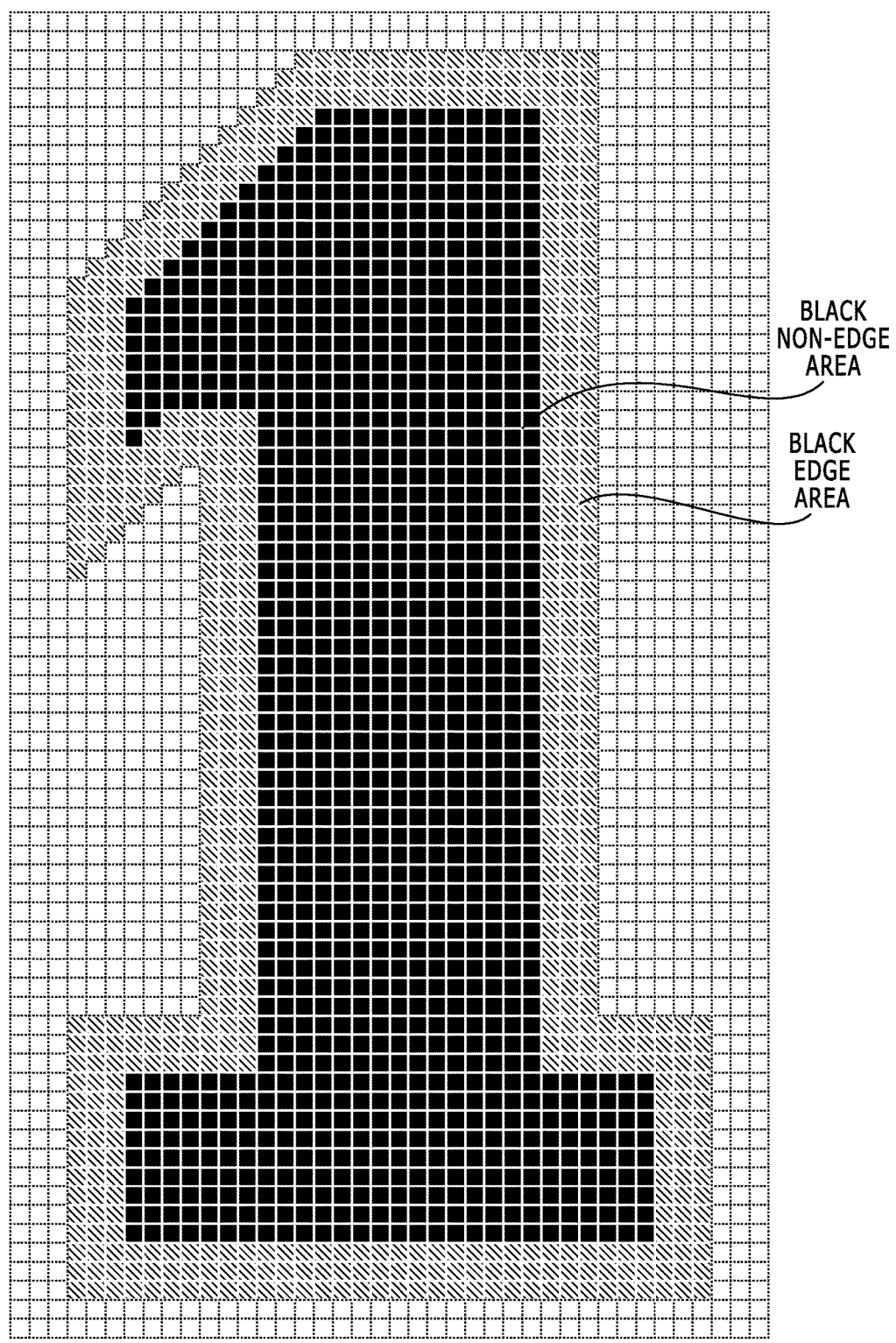
FIG. 3 shows a diagram that indicates an example of a black edge area (an area of a pixel having a black edge property) and a black non-edge area (an area of a pixel having a low-lightness-low-saturation property) in the character shown in FIG. 2.

The pixel property determining unit 23 determines as a black edge property a property of a pixel that belongs to the edge area and belongs to the low-lightness-low-saturation area. The pixel property determining unit 23 determines as a black non-edge property a property of a pixel that does not belong to the edge area and belongs to the low-lightness-low-saturation area. FIG. 2 shows a diagram that indicates an example of a character in an input image. FIG. 3 shows a diagram that indicates an example of a black edge area (an area of a pixel having a black edge property) and a black non-edge area (an area of a pixel having a black non-edge property) in the character shown in FIG. 2.

Further, if a pixel with the black non-edge property exists in a reference window of a predetermined size of which a center is set at a pixel with the black edge property, then the pixel property determining unit 23 sets a property of this pixel with the black edge property as the character edge property (i.e. changes the property of the pixel from the black edge property to the character edge property).

Furthermore, if a pixel with the black edge property exists in a reference window of a predetermined size of which a center is set at a pixel with the black non-edge property, then the pixel property determining unit 23 sets a property of this pixel with the black non-edge property as the character inside property (i.e. changes the property of the pixel from the black non-edge property to the character inside property).

The vertical and horizontal sizes of the aforementioned reference window are set, for example, as 7 pixels, respectively.

Figure 4:
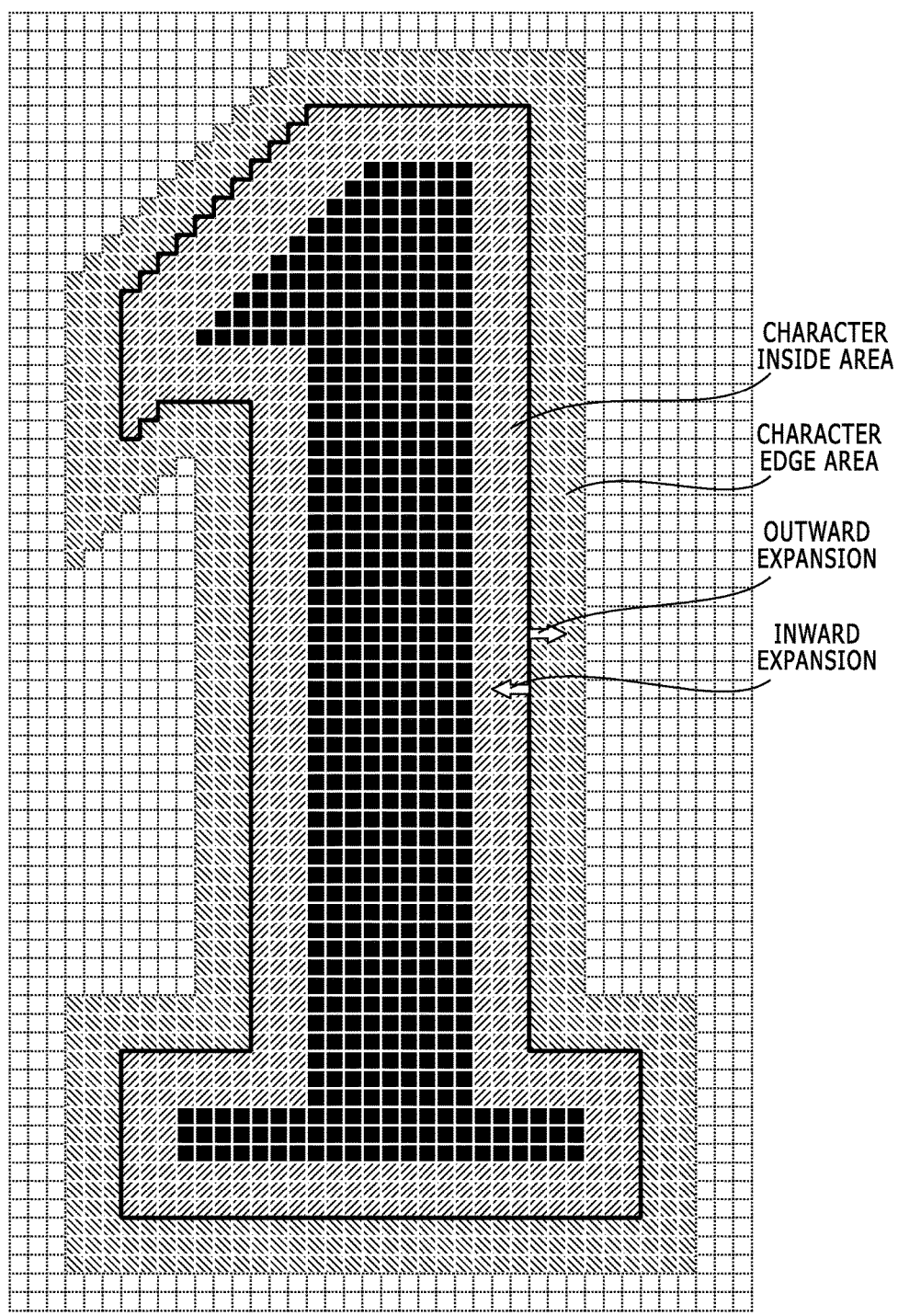
FIG. 4 shows a diagram that indicates an example of a character edge area and a character inside area in the character shown in FIGS. 2 and 3.

FIG. 4 shows a diagram that indicates an example of a character edge area and a character inside area in the character shown in FIGS. 2 and 3. The character edge area and the character inside area shown in FIG. 4 are a character edge area and a character inside area determined by applying a 7-pixel-by-7-pixel reference window to the black edge area and the black non-edge area shown in FIG. 3.

It should be noted that an area of a pixel having the character edge property is the character edge area, and an area of a pixel having the character inside property is the character inside area.

Further the pixel property determining unit 23 determines as a blank area an area of a pixel having neither the character edge property nor the character inside property. It should be noted that if the input image includes an object (such as photograph or the like) other than a character, such an object is excluded from the character edge area and the character inside area.

The output image processing unit 12 performs an expansion process for the character edge area and/or the character inside area, and performs image processing needed for printing based on the image data.

The output image processing unit 12 is capable of performing (a) an inward expansion process for a pixel belonging to the character inside area, the inward expansion process performed inwardly from the character edge area toward the character inside area and (b) an outward expansion process for a pixel belonging to the character edge area, the outward expansion process performed outwardly from the character inside area toward the character edge area.

In the inward expansion process, a density of a pixel in the character inside area is increased, specifically in a predetermined range from a pixel with the character edge property on a boundary between the character edge area and the character inside area. The character edge area is expressed with black other than chromatic toner colors, and therefore the inward expansion process increases the black density of the aforementioned pixel.

In the outward expansion process, a density of a pixel in the character edge area is increased, specifically in a predetermined range from a pixel with the character edge property on a boundary between the character edge area and the character inside area. The character inside area is expressed with chromatic toner colors other than black, and therefore the outward expansion process increases the densities of the chromatic toner colors (here, Cyan, Magenta and Yellow) of the aforementioned pixel.

The output image processing unit 12 selects the inward expansion process and/or the outward expansion process in accordance with an average brightness value of pixels belonging to the character inside area, and performs the selected the inward expansion process and/or the outward expansion process.

Further in this embodiment, the output image processing unit 12 sets intensities (here, trapping amounts mentioned below) of the inward expansion process and the outward expansion process so that the intensities correspond to the aforementioned average brightness value and/or a distance from a boundary between the character edge area and the character inside area (a distance from a pixel having the character edge property on the boundary).

Figure 5:
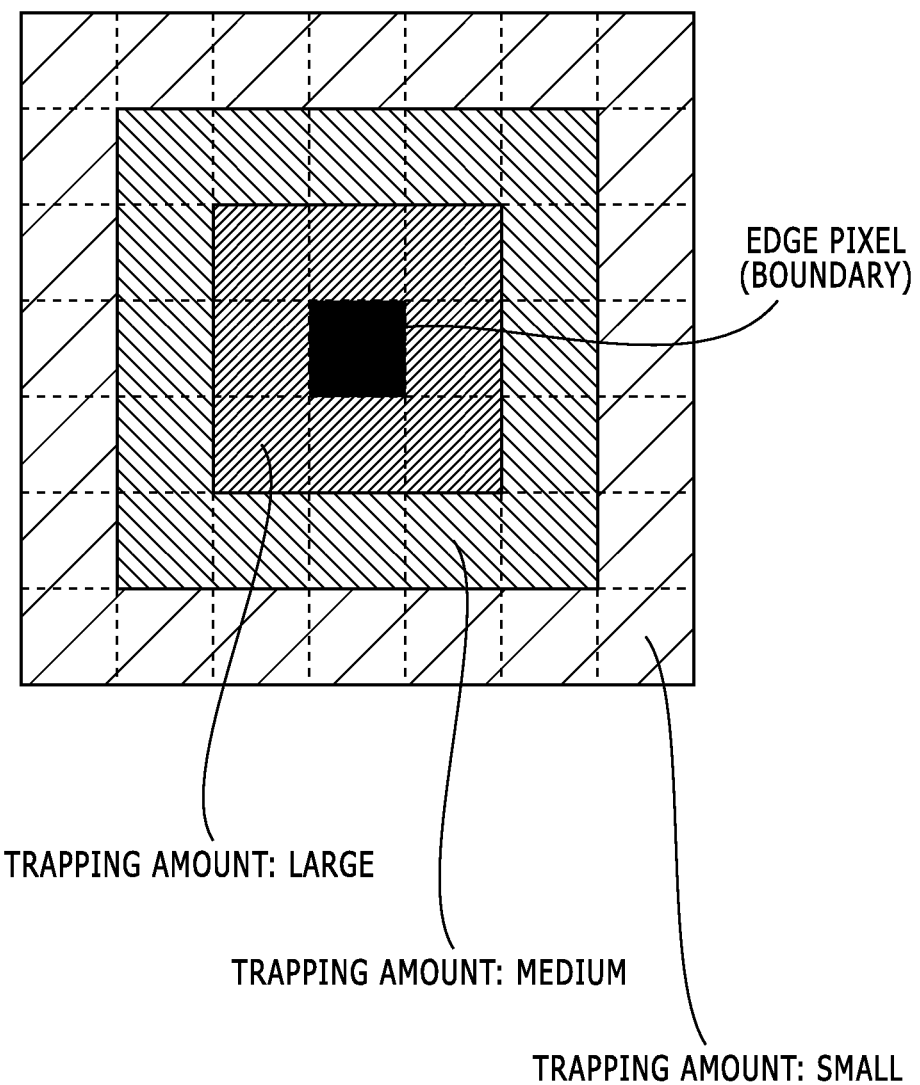
FIG. 5 shows a diagram that explains intensities of the inward expansion process and the outward expansion process in the image forming apparatus shown in FIG. 1.

FIG. 5 shows a diagram that explains intensities of the inward expansion process and the outward expansion process in the image forming apparatus shown in FIG. 1. As shown in FIG. 5, a lower distance from a boundary between the character edge area and the character inside area (from a pixel having the character edge property on the boundary) causes a larger trapping amount (i.e. additional density amount). FIG. 5 shows a distribution of the trapping amounts when using the 7-pixel-by-7-pixel reference window.

In this embodiment, if the aforementioned average brightness value is larger than the predetermined threshold brightness value, then the output image processing unit 12 performs the outward expansion process without performing the inward expansion process; and otherwise, if the aforementioned average brightness value is equal to or lower than the predetermined threshold brightness value, then the output image processing unit 12 performs the inward expansion process without performing the outward expansion process.

It should be noted that the output image processing unit 12 may perform both of the inward expansion process and the outward expansion process. In such a case, for example, the output image processing unit 12 increases the intensity of the outward expansion process and decreases the intensity of the inward expansion process for a larger value of the aforementioned average brightness value.

In addition, for example, the output image processing unit 12 performs for a character area an edge emphasis process using a differentiation filter or the like, and a color correction process, a black generation/UCR (Under Color Removal) process, a half-toning process and the like suitable to the character area; and performs for a half-tone dot area or a background area a smoothing process using an integration filter or the like, and a color correction process, a black generation/UCR process, an intermediate gradation, a half-toning process and the like suitable to the half-tone dot area or the background area. Consequently, a character part in a print image is made clear, and moire and/or noise are restrained in a halftone dot area.

Figure 6:
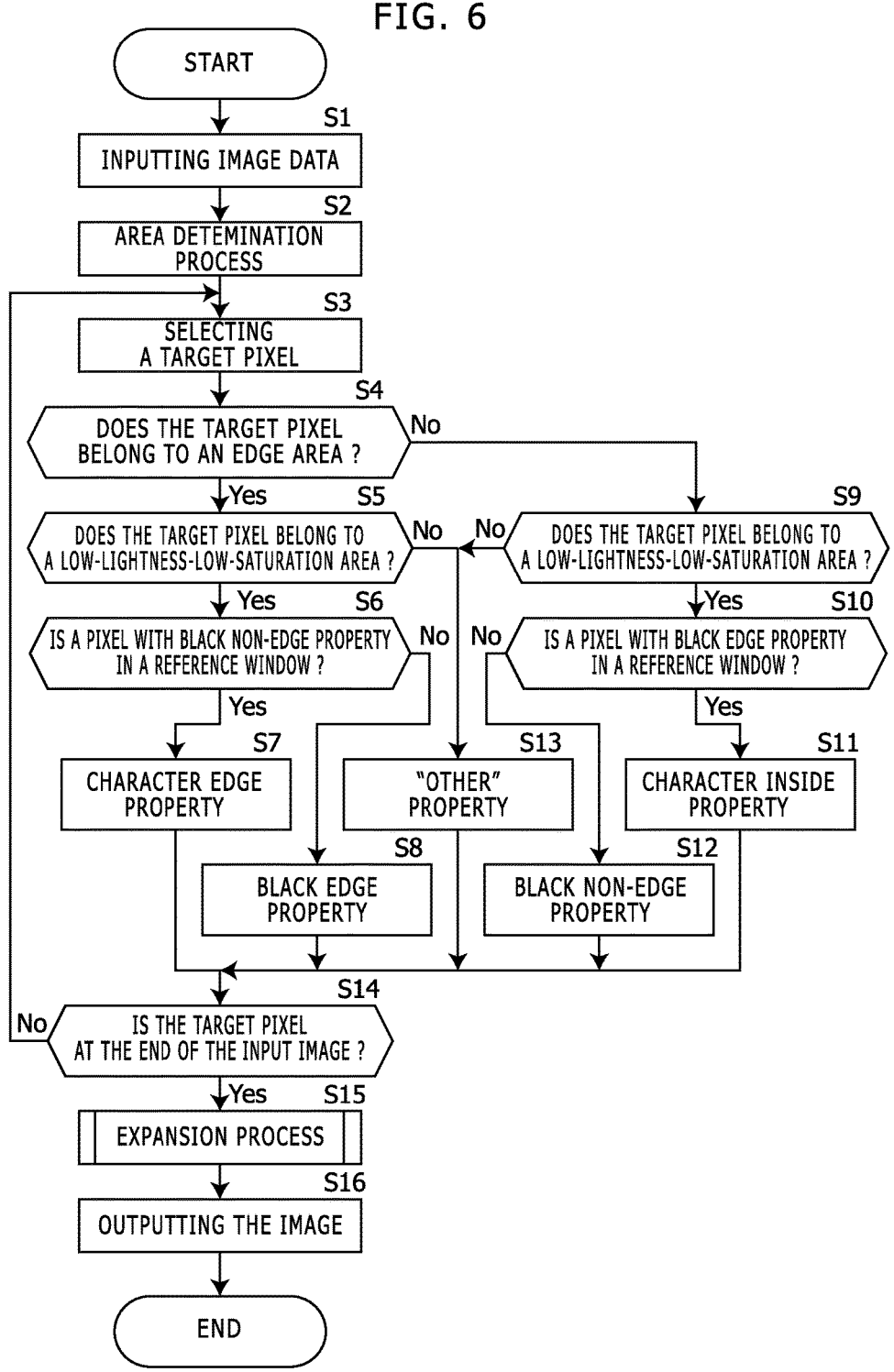
FIG. 6 shows a flowchart that explains a behavior of the image forming apparatus shown in FIG. 1.
Figure 7:
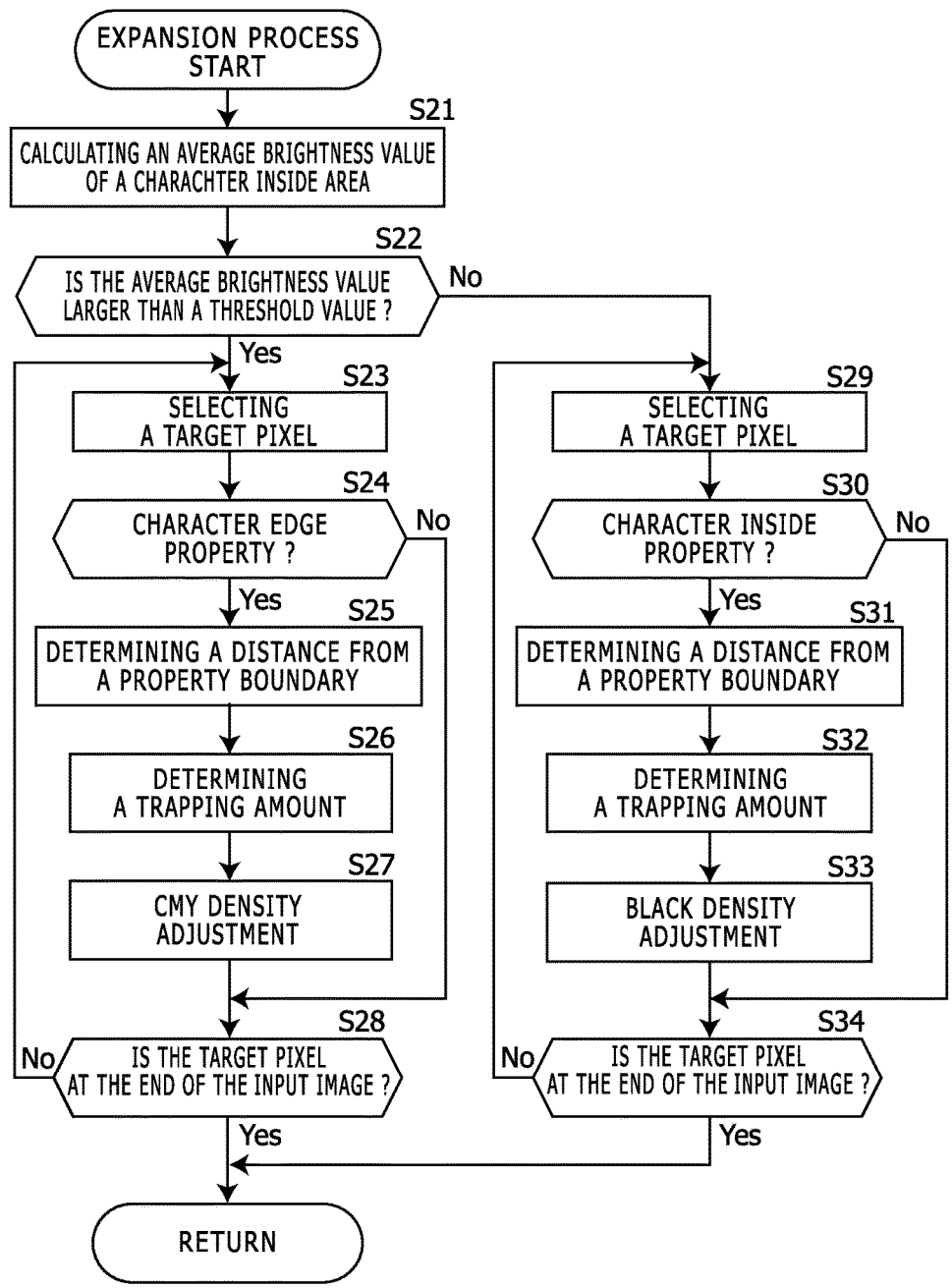
FIG. 7 shows a flowchart that explains the expansion process (Step S15) in FIG. 6.

The following part explains a behavior of the aforementioned image forming apparatus. FIG. 6 shows a flowchart that explains a behavior of the image forming apparatus shown in FIG. 1. FIG. 7 shows a flowchart that explains the expansion process (Step S15) in FIG. 6.

Firstly, the image inputting unit 1 generates bitmap image data of a document image scanned by an image scanner, and stores the bitmap image data in an unshown memory or the like (in Step S1).

The image area determining unit 11 reads the bitmap image data, sets the document image as an input image, and performs an area determination process for the input image in the aforementioned manner, and thereby determines an edge area and a low-lightness-low-saturation area in the input image (in Step S2).

Subsequently, the pixel property determining unit 23 repeatedly selects a target pixel in turn along a predetermined scanning order in the input image (in Step S3).

For each target pixel, the pixel property determining unit 23 determines whether the target pixel belongs to the edge area or not (in Step S4).

If the target pixel belongs to the edge area, then the pixel property determining unit 23 determines whether the target pixel belongs to the low-lightness-low saturation area or not (in Step S5).

If the target pixel belongs to the edge area and belongs to the low-lightness-low saturation area, then the pixel property determining unit 23 determines whether a pixel with the black non-edge property (i.e. a pixel that does not belong to the edge area and belongs to the low-lightness-low-saturation area) exists in the aforementioned reference window of which a center is set at the target pixel or not (in Step S6).

In a case that the target pixel belongs to the edge area and belongs to the low-lightness-low saturation area, if a pixel with the black non-edge property exists in the aforementioned reference window, then the pixel property determining unit 23 sets a property of the target pixel as the character edge property (in Step S7).

Contrarily, in a case that the target pixel belongs to the edge area and belongs to the low-lightness-low saturation area, if no pixels with the black non-edge property exist in the aforementioned reference window, then the pixel property determining unit 23 sets a property of the target pixel as the black edge property (in Step S8).

Further, if the target pixel does not belong to the edge area (in Step S4), then the pixel property determining unit 23 determines whether the target pixel belongs to the low-lightness-low-saturation area or not (in Step S9).

Furthermore, if the target pixel does not belong to the edge area and the target pixel belongs to the low-lightness-low saturation area, then the pixel property determining unit 23 determines whether a pixel with the black edge property (i.e. a pixel that belongs to the edge area and belongs to the low-lightness-low-saturation area) exists in the aforementioned reference window of which a center is set at the target pixel or not (in Step S10).

In a case that the target pixel does not belong to the edge area and the target pixel belongs to the low-lightness-low saturation area, if a pixel with the black edge property exists in the aforementioned reference window, then the pixel property determining unit 23 sets a property of the target pixel as the character inside property (in Step S11).

Contrarily, in a case that the target pixel does not belong to the edge area and the target pixel belongs to the low-lightness-low saturation area, if no pixels with the black edge property exist in the aforementioned reference window, then the pixel property determining unit 23 sets a property of the target pixel as the black non-edge property (in Step S12).

In Step S5 or S9, if it is determined that the target pixel does not belong to the low-lightness-low-saturation area, then a property of the target pixel is set as an "other" property (in Step S13).

Upon the property of the target pixel is determined as mentioned, the pixel property determining unit 23 determines whether properties of all pixels in the input image have been determined or not (in Step S14), and if there is a pixel of which a property has not been determined, returning to Step S3, selects a next target pixel and performs the same processes for the next target pixel.

Contrarily, if all pixels in the input image have been determined, then the output image processing unit 12 performs the expansion process shown in FIG. 7 (in Step 15).

As shown in FIG. 7, in the expansion process, firstly the output image processing unit 12 calculates an average brightness value of pixels belonging to the character inside area (in Step S21). Subsequently, the output image processing unit 12 determines whether the average brightness value is larger than the predetermined threshold brightness value or not (in Step S22).

If the average brightness value is larger than the predetermined threshold brightness value, then the output image processing unit 12 performs processes in Steps S23 to S28 (i.e. trapping of CMY for the character edge area); and if not, then the output image processing unit 12 performs processes in Steps S29 to S34 (i.e. trapping of Black for the character inside area).

If the average brightness value is larger than the predetermined threshold brightness value (i.e. in case of a low density), then the output image processing unit 12 repeatedly selects a target pixel along a predetermined scanning order in the input image (in Step S23).

For each target pixel, the output image processing unit 12 determines whether the target pixel has the character edge property or not (in Step S24).

If the target pixel has the character edge property, the output image processing unit 12 determines a distance (the number of pixels) between the target pixel and a pixel with the character edge property on a boundary between the character edge area and the character inside area (in Step S25), and determines a trapping amount corresponding to the distance (in Step S26).

Subsequently, the output image processing unit 12 increases densities of the chromatic toner colors (here Cyan, Magenta, and Yellow) by the determined trapping amount (in Step S27).

Contrarily, if the target pixel does not have the character edge property (in Step S24), then this trapping is not performed.

When finishing the processes as mentioned for the target pixel, the output image processing unit 12 determines whether all pixels in the input image have been processed or not (in Step S28); and if there is an unprocessed pixel, then returning to Step S23, selects a next target pixel and performs the same processes for the next target pixel.

Contrarily, if all pixels in the input image have been processed, then the output image processing unit 12 terminates the expansion process.

Otherwise, if the average brightness value is equal to or lower than the predetermined threshold brightness value (i.e. in case of a high density), then the output image processing unit 12 repeatedly selects a target pixel along a predetermined scanning order in the input image (in Step S29).

For each target pixel, the output image processing unit 12 determines whether the target pixel has the character inside property or not (in Step S30).

If the target pixel has the character inside property, the output image processing unit 12 determines a distance (the number of pixels) between the target pixel and a pixel with the character edge property on a boundary between the character edge area and the character inside area (in Step S31), and determines a trapping amount corresponding to the distance (in Step S32).

Subsequently, the output image processing unit 12 increases a density of Black by the determined trapping amount (in Step S33).

Contrarily, if the target pixel does not have the character inside property (in Step S30), then this trapping is not performed.

When finishing the processes as mentioned for the target pixel, the output image processing unit 12 determines whether all pixels in the input image have been processed or not (in Step S34); and if there is an unprocessed pixel, then returning to Step S29, selects a next target pixel and performs the same processes for the next target pixel.

Contrarily, if all pixels in the input image have been processed, then the output image processing unit 12 terminates the expansion process.

Thus, as mentioned, if the average brightness of the character inside property is low, then trapping is performed for Black; and therefore the character edge area is expanded, but bordering the character is not easily recognized visually due to the low average brightness of the character inside property. In addition, the trapping is performed for only one color i.e. Black, and therefore a toner consumption amount needed for the trapping is lower than that for three chromatic colors.

Returning to FIG. 6, after finishing the expansion process, the image processing unit 2 appropriately performs other image processing and causes the image outputting unit 3 to perform printing of the input image for which the image processing has been done (in Step S16). Here, the aforementioned trapping amount is excluded when performing the black generation and UCR process. Otherwise, the aforementioned expansion process may be performed after the black generation and UCR process.

In the aforementioned embodiment, the image area determining unit 11 determines a character edge area and a character inside area in an input image. The output image processing unit 12 is capable of performing (a) an inward expansion process for a pixel belonging to the character inside area, the inward expansion process performed inwardly from the character edge area and (b) an outward expansion process for a pixel belonging to the character edge area, the outward expansion process performed outwardly from the character inside area. Further, the output image processing unit 12 selects the inward expansion process and/or the outward expansion process in accordance with an average brightness value of pixels belonging to the character inside area, and performs the selected the inward expansion process and/or the outward expansion process.

Thus, the trapping restrains the blank gap in a thick character with a low lightness and a low saturation, and therewith the outward expansion process is performed in accordance with the average brightness value of pixels belonging to the character inside area, and consequently, the unintentional bordering does not easily occur.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    an image area determining unit configured to determine a character edge area and a character inside area in an input image; and
    an image processing unit configured to be capable of performing (a) an inward expansion process for a pixel belonging to the character inside area, the inward expansion process performed inwardly from the character edge area and (b) an outward expansion process for a pixel belonging to the character edge area, the outward expansion process performed outwardly from the character inside area;
    wherein the image processing unit selects the inward expansion process and/or the outward expansion process in accordance with an average brightness value of pixels belonging to the character inside area, and performs the selected the inward expansion process and/or the outward expansion process.

2. The image forming apparatus according to claim 1, wherein the image processing unit sets intensities of the inward expansion process and the outward expansion process so that the intensities correspond to a distance from a boundary between the character edge area and the character inside area, and performs the inward expansion process and the outward expansion process with the set intensities.

3. The image forming apparatus according to claim 1, wherein the image processing unit performs the inward process for a black other than chromatic toner colors and performs the outward process for chromatic toner colors other than black.

4. The image forming apparatus according to claim 1, wherein if the average brightness value is larger than a predetermined threshold value, then the image processing unit performs the outward expansion process without performing the inward expansion process.

5. The image forming apparatus according to claim 1, wherein the image area determining unit determines an area of an edge pixel as the character edge area in the input image if (a1) this edge pixel has a lightness lower than a predetermined threshold lightness value and a saturation lower than a predetermined threshold saturation value and (a2) a non-edge pixel exists in a predetermined range from this edge pixel, and determines an area of a non-edge pixel as the character inside area in the input image if (b1) this non-edge pixel has a lightness lower than the predetermined threshold lightness value and a saturation lower than the predetermined threshold saturation value and (b2) an edge pixel exists in a predetermined range from this non-edge pixel.

* * * * *